United States Patent [19]
Green et al.

[11] Patent Number: 6,071,579
[45] Date of Patent: Jun. 6, 2000

[54] LAMINATED AIR BRAKE TUBING

[75] Inventors: Edward A. Green, Mantua; Glenn M. Gregrich, Stow; Iani Manas, Orange, all of Ohio

[73] Assignee: Furon, Laguna Niguel, Calif.

[21] Appl. No.: 09/022,160

[22] Filed: Feb. 11, 1998

[51] Int. Cl.[7] ........................................ B32B 1/08
[52] U.S. Cl. .................... 428/36.3; 428/36.91; 138/125; 138/126; 138/141; 138/137
[58] Field of Search .................. 428/36.3, 36.9, 428/36.91, 36.2, 36.4, 476.1; 138/137, 125, 126, 140, 141, 124; 361/215; 303/127, 9.66

[56] References Cited

U.S. PATENT DOCUMENTS

| | | | |
|---|---|---|---|
| 3,601,524 | 8/1971 | Kauffman | 174/74 |
| 3,814,138 | 6/1974 | Courtot | 138/124 |
| 4,308,896 | 1/1982 | Davis | 138/126 |
| 4,717,326 | 1/1988 | Motonaga et al. | 425/133.1 |
| 4,998,565 | 3/1991 | Kokuryu et al. | 138/126 |
| 5,038,833 | 8/1991 | Brunnnhofer | 138/137 |
| 5,076,329 | 12/1991 | Brunnhofer | 138/137 |
| 5,225,482 | 7/1993 | Nakagawa et al. | 525/71 |

FOREIGN PATENT DOCUMENTS 84014058 4/1984 Japan .
WO 97/44186 11/1997 WIPO .

*Primary Examiner*—Ellis Robinson
*Assistant Examiner*—Laura L. Lee
*Attorney, Agent, or Firm*—Wood, Herron & Evans, LLP

[57] ABSTRACT

A laminated air brake tubing includes inner and outer nylon layers with an intermediate fiber reinforcing layer. The tubing further includes one and preferably two layers of high density polyethylene positioned adjacent either of said nylon layers with a protective layer separating the fiber reinforcing layer from the high density polyethylene layer. The protective layer is preferably a thin layer of nylon or nylon alloy. Further, the high density polyethylene layer may include compatibilizing agents preventing delamination. The air brake tubing of the present invention meets the current requirements for air brake tubing, however it is less expensive than currently available air brake tubing.

14 Claims, 1 Drawing Sheet

LAMINATED AIR BRAKE TUBING

BACKGROUND OF THE INVENTION

Air brake systems are frequently employed for heavy-duty vehicles such as tractor trailers and the like. In such systems, the brake system is activated by pressurized air transported through tubing. Metal tubing, of course, can be employed. However, generally nylon tubing is used and in many applications, reinforced nylon tubing is required. By industry standards, reinforced nylon tubing must include an inner nylon layer and an outer nylon layer with an intermediate polyester or nylon reinforcing layer. This tube is designed to operate at a maximum pressure of 150 psi over a wide temperature range i.e. −40° C. to 90° C. The test requirements are even more strenuous requiring the tubing to withstand 150 psi pressure at temperatures from −40° up to 110C.

In the past, such polyester reinforced nylon tubing has performed quite well. It meets the minimum requirements with respect to temperature and pressure and generally exceeds these. In certain applications, it may be desirable to further broaden the temperature characteristics of such tubing. Further nylon itself is relatively expensive. High density polyethylene (HDPE) on the other hand has greater temperature range and is significantly less expensive than nylon. Nylon has been utilized for an extended period of time in automotive and trucking applications and therefore it's characteristics with respect to fuel stability and the like are well known. Therefore air brake tubing still requires that the inner and outer layers be nylon.

If one were to simply utilize a layer of high density polyethylene within the reinforced nylon brake tubing, in turn reducing the amount of nylon, the formed product will tend to delaminate if repeatedly subjected to high pressures. In effect, stress cracking occurs where the polyester strand contacts the HDPE layer.

Accordingly, it is an object of the present invention to provide a laminated, reinforced tubing which does not delaminate. Further, it is an object of the present invention to provide such a laminated air brake tubing that has improved low temperature characteristics. Further, it is an object of the present invention to provide such a laminated tubing utilizing layer of a polyolefin preferably high density polyethylene, HDPE.

The present invention is premised on the realization that such a tubing can be formed wherein the polyolefin layer is separated from the polyester layer with a protective layer. Preferably, according to the present invention, such a laminated tubing includes an inner layer of nylon, an intermediate HDPE layer, a braided polyester layer, and an outer nylon layer plus a protective layer which separates the HDPE from the polyester braiding.

In a preferred embodiment of the present invention, the laminated tubing includes two layers of HDPE, one on either side of the polyester braiding with protective layers separating the polyester from the HDPE. Although a variety of protective layers could be employed, the preferred protective layer is a thin layer of nylon, preferably, nylon 11 or 12.

The objects and advantages of the present invention will be further appreciated in light of the following detailed descriptions and drawing in which:

DETAILED DESCRIPTION

Figure 1:
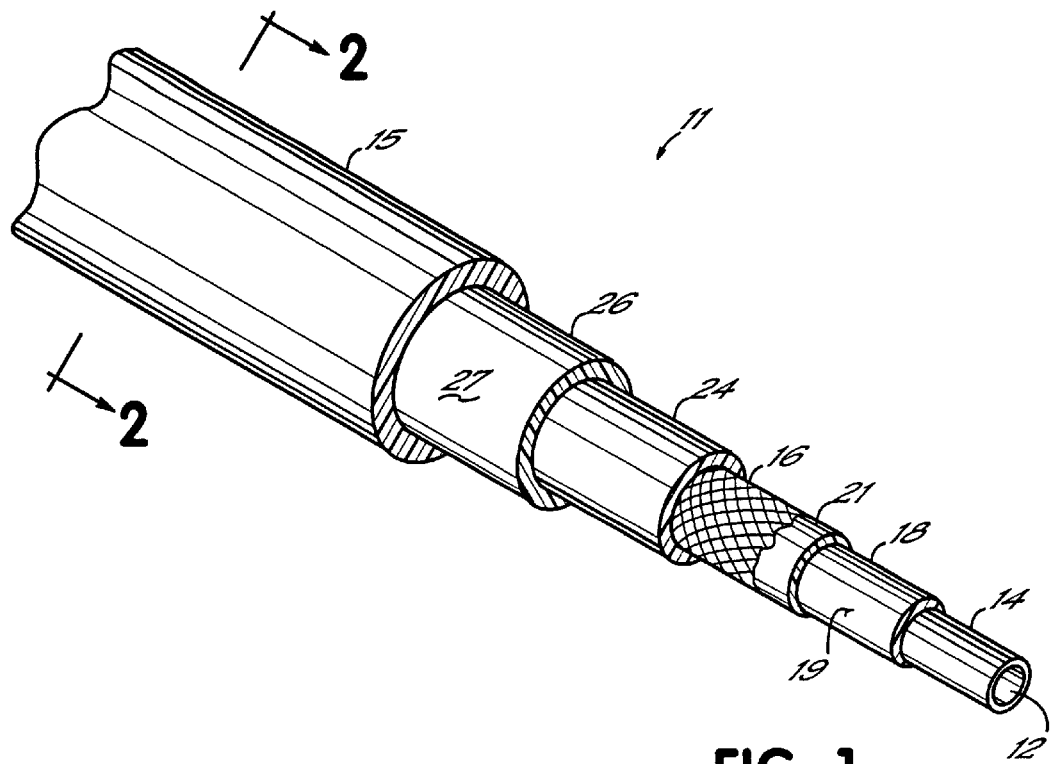
FIG. 1 is a fragmentary prospective view of air brake tubing made according to the present invention.
Figure 2:
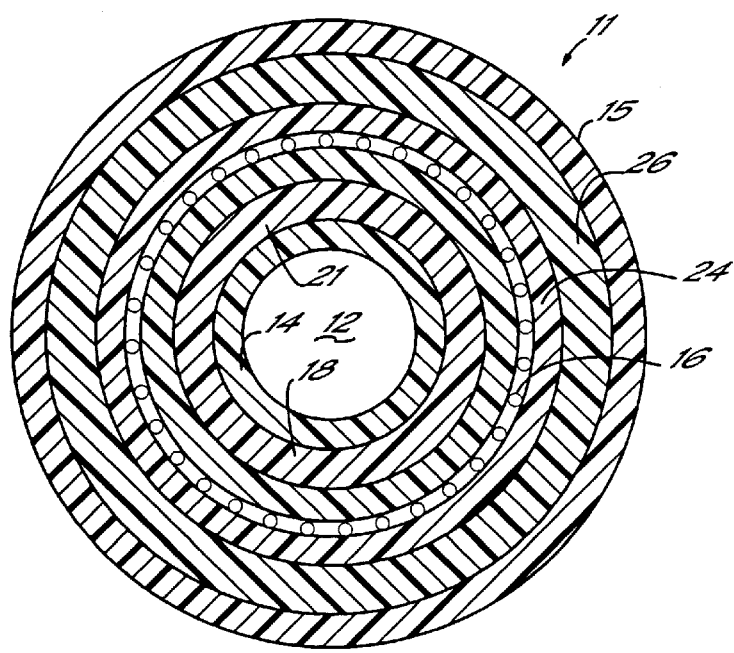
FIG. 2 is a cross-sectional view taken at lines 2—2 of FIG. 1.

As shown in the drawings, the present invention is an air brake tubing 11 which has a central inner passageway 12 having a diameter generally from about 0.251 to about 0.556 inches. Tubing 11 has an inner nylon layer 14 and an outer nylon layer 15 with a central layer of fiber reinforcement or braiding 16.

Tubing 11 further includes a first layer 18 of polyolefin which has a thickness of about 0.024 to 0.039 inches. Generally for brake tubing the polyolefin will be high density polyethylene. However, for other applications, low density polyethylene, polypropylene or polybutylene may be employed. This is bonded to the outer surface 17 of inner nylon layer 14. Covering the outer surface 19 of polyolefin layer 18 is a first protective layer 21.

The outer surface of protective layer 21 in turn is bonded to or embedded in the braiding 16. Braiding 16 is likewise covered by a second protective layer 24. Both protective layers have a thickness of about 0.005 to about 0.010 inches The outer surface of the second protective layer 24 is in turn surrounded and bonded to a second layer 26 of polyolefin again preferably HDPE. The outer surface 27 of layer 26 in turn is bonded to outer nylon layer 15.

Both inner and outer nylon layers have a thickness of about 0.005 to about 0.010. Likewise, for brake tubing applications both layers of polyolefin have a thickness of about 0.024 to about 0.039 inches with the two protective layers having a thickness of about 0.005 to 0.010 inch.

The nylon layers are generally formed from nylon 11 or nylon 12. Commercially available plasticized polyamide such as plasticized nylon 11 (ELF ATOCHEM Brand RILSAN BNSO E40TL) or plasticized nylon 12 (EMSER brand GRILA MID L25W40NZ) can be utilized in the invention. In addition alloys of nylon 11 and/or nylon 12 can be employed. These alloys, include nylon blended together with less than 50% by weight of a compatible polymer such as high density polyethylene. Hereinafter the term nylon is intended to include both 100% nylon as well as comparably performing nylon blends or alloys.

In the preferred embodiment of the present invention, the polyolefin layer will be high density polyethylene as well as comparably performing nylon/polyethylene blends or alloys. The high density polyethylene has a density of about 0.94 to about 0.96 and a melt index of 0.01–3.0 It may include suitable stablizers, processing aids and the like which are typically added to polyethylene. Further, the polyethylene can include a compatibilizing agent to enhance the bonding between the polyamide and the polyethylene layers. A suitable compatibilizing agent is maleic anhydride modified polyolefin. Generally, the nylon content of any polyethylene blend can be up to about 50% by weight.

Preferably the high density polyethylene utilized in the present invention includes from about 40 to 98% high density polyethylene from about 1 to 30% compatibilizing agent and from about 1 to about 30% stabilizer. Preferred high density polyethylenes are sold by Exxon Chemical under the name Escorene HD9856B. A suitable compatibilizing agent is Uniroyal's Polybond brand 3009 which has 10% maleic anhydride grafted onto high density polyethylene. The stabilizer content is about 30 to 99% high density polyethylene combined with 0.5 to 70% of an antioxidant or blend of antioxidants such as Irganox 1010 supplied by CIBA Specialty Chemicals. These components are dry blended together and then extruded to form the high density polyethylene layers.

The reinforcing or braiding layer is generally formed from strands of polymeric fibers and preferably polyester fibers. These should have a weight of 500–1000 denier, with 840 denier being preferred. Commercially available polyester fiber is sold by Hoechst Cellanese under the designation 500 denier and 840/70/VAR.

The protective layer 21 can be any layer which is compatible with both the high density polyethylene, the braiding and the nylon layers. There are preferably nylon 11 or nylon 12 or alloys of nylon with high density polyethylene.

To form the tubing 11 of the present invention, the inner nylon tube 14 is coextruded along with the polyolefin high density polyethylene layer 18 and the first protective layer 21. The melt temperature of the nylon extruder should be 440° F. to about 460° F. preferably 450° F. In the preferred embodiment the protective layer 21 is nylon and is also formed by this extruder. The melt temperature of the polyethylene extruder which is preferably a 2½ inch single screw extruder is 400° F. to 450° F., preferably 420° F. Again, the first protective layer is coextruded over the high density polyethylene layer at a temperature of about 440° F. to about 460° F.

The braiding 16 is then applied over the protective layer 21 by passing the three layer extruded tubing through a braider or fiber reinforcing apparatus. The reinforcing material may be braided, knitted, or spirally wrapped wherein one strand of the material is applied in a pitch to one direction and another strand is applied over the first with a pitch to the opposite direction. The braider is preferably a counter rotating fiber reinforcing device or may be any suitable and known conventional braiders. Preferably the braided layer 16 is applied with 6 bobbins of fiber applied from 2 to 5 pics per inch, preferably 3 pics per inch.

Once the braiding is applied, the outer three layers are coextruded over the inner tubing in the same manner as the inner three layers at the same temperatures. This can then be passed through a cooling bath. The resulting extruded product has an outer diameter of about 0.125 to about 0.75 inches and is ready for use.

The following detailed example demonstrates the characteristics of the laminated tubing in the present invention and clearly demonstrates that high stress cracking was inhibited utilizing the seven layer tube construction of the present invention.

EXAMPLE

A seven layer reinforced air brake tube was formed having the following construction:

Most Inner                                                                                     Outer Layer
:Layer Nylon12*/HDPE**/Nylon12/Yarn/Nylon12/HDPE/Nylon12
Thickness      5      18      5      —      5      18      12
(mils)

*Nylon12 = L25W40NZ Nat. 844 from Emser.
**HDPE = Escorene HD-9856B from Exxon Chemical Co., Houston, TX.

As shown below, the seven layer embodiment fulfills the requirements of SAE J844 and DOT-106.

| | | 7 Layered Product | | |
|---|---|---|---|---|
| SAE J844 Requirements TEST DEFINITION | SPEC REQUIREMENT | Nylon Control Test Value | | Seven Layer Airbrake Tubing | |
| | | 3/8" | 1/2" | 3/8" | 1/2" |
| 9.2 Moisture Absorption | 2% Max. | 1.40% | 1.35% | 0.91% | 0.91% |
| 9.3 UV Resistance 300 hrs Quv tester with UVA-340 bulb | 80% min burst after ambient impact | Pass 1720 psi | Pass 980 psi | Pass 1832 psi | Pass 1525 psi |
| 9.4 Cold Temperature Flexibility | No Fractures | Pass 1451 psi | Pass 1062 psi | Pass 1617 psi | Pass 1392 psi |
| 9.5 Heat Aging Phase I Phase II Phase III | 80% min burst after ambient impact | Pass 1279 psi 1280 psi | Pass 1135 psi 1141 psi | Pass 1416 psi 1493 psi | Pass 1391 psi 1340 psi |
| 9.6 Resistance to Zn Chloride | No visible cracks | Pass | Pass | Pass | Pass |
| 9.7 Resistance to Methanol | No visible cracks | Pass | Pass | Pass | Pass |
| 9.8 Stiffness | 3/8 "- 8 lbs 1/2 "- 20 lbs | 3.7 lbs | 8.9 lbs | 6.7 lbs | 16.5 lbs |
| 9.9 Boiling Water Burst | 80% rated burst | 1739 psi | 945 psi | 1334 psi | 1112 psi |
| 9.10 Room Temp Burst | 3/8 "- 1400 psi 1/2 "- 950 psi | 1457 psi | 1113 psi | 1647 psi | 1471 psi |
| 9.11 Cold Temperature Impact | 80% rated burst after -40 F impact | Pass 1558 psi | Pass 1252 psi | Pass 1665 psi | Pass 1427 psi |

-continued

7 Layered Product

| SAE J844 Requirements TEST DEFINITION | SPEC REQUIREMENT | Nylon Control Test Value | | Seven Layer Airbrake Tubing | |
|---|---|---|---|---|---|
| 9.12 Adhesion Test | inseperatable | Pass | Pass | Pass | Pass |
| 9.13 Heat Age Adhesion | inseperatable | Pass | Pass | Pass | Pass |
| 9.14 Collapse Resistance | 20% Max Collapse | Pass | Pass | Pass | Pass |

| DOT-106 requirements TEST DEFINITION | SPEC REQUIREMENT | Nylon Control Test Value | | Seven Layer Airbrake Tubing | |
|---|---|---|---|---|---|
| | | 3/8" | 1/2" | 3/8" | 1/2" |
| S7.3.2 High Temperature Resistance - condition around a mandrel for 70 hrs at 212 F After cooling straighten | No Visible Cracks 3/8" - 5" dia. 1/2" - 7" dia. | Pass | Pass | Pass | Pass |
| Sk7.3.3 Low Temperature Resistance - After conditioning for 70 hrs at 40 F Bend around a mandrel | No Visible Cracks 3/8" - 5" dia. 1/2" - 7" dia. | Pass | Pass | Pass | Pass |
| S7.3.4 Oil Resistance - 70 hrs at 212 F in ASTM #3 oil | 100% Maximum Swell | Pass −3.0% | Pass −3.7% | Pass 2.8% | Pass 3.1% |
| S7.3.5 Ozone Resistance | No cracks in Outer Cover | Pass | Pass | Pass | Pass |
| S7.3.6 Length Change | −7% to +5% at 200 psi | 0% | 0% | 0% | 0% |
| S7.3.7 Adhesion | 8 PLI min | Pass | Pass | Pass | Pass |
| S7.3.8 Air Pressure | 5 psi lost in 5 min with 200 psi in hose | Pass | Pass | Pass | Pass |
| S7.3.9 Burst Strength | 800 psi min. | 1229 | 1031 | 1526 | 1240 |
| S7.3.10 Tensile Strength compressino fittings | 3/8" or 1/2" - 150 lbs | 197 | 265 | 194 | 285 |
| S7.3.11 Water Absorption and tensile strength | requirements as above | 225 | 325 | 212 | 281 |
| S7.3.12 Zinc Chloride resistance | No cracks with power magnification | Pass | Pass | Pass | Pass |

As shown by this example the seven layer embodiment of the present invention meets the technical specifications of the DOT and the SAE and tubing of the present invention is less expensive than reinforced nylon tubing. Thus, utilizing the present invention one achieves savings without reduction in required performance of the air brake tubing.

This, of course, has been a description of the present invention along with the preferred method of practicing the present invention known to the inventors. However, the invention itself should be defined only by the appended claims wherein we claim:

1. Delamination resistant air brake tubing comprising an inner most nylon layer, an outer nylon layer, first high density polyethylene layer and a polyester fiber reinforcing layer having an inner and outer surface said high density polyethylene layer and said fiber reinforcing layer located between said inner and outer nylon layers; a protective layer adjacent one of said inner and outer surfaces of said fiber layer separating said high density polyethylene layer from said fiber reinforcing layer wherein the protective layer is compatible with both the high density polyethylene and the fiber reinforcing layers.

2. The air brake tubing claimed in claim 1 wherein said protective layer is nylon.

3. The air brake tubing claimed in claim 2 wherein said first high density polyethylene layers is adjacent said outer nylon layer and wherein said tubing further comprises a second high density polyethylene layer adjacent said inner nylon layer wherein said tubing further comprises a second protective layer separating said second high density polyethylene layer from the inner surface of said fiber reinforcing layer.

4. The air brake tubing claimed in claim 1 wherein said nylon is selected from the group consisting of nylon 11 and nylon 12.

5. The air brake tubing claimed in claim 1 wherein said nylon is a nylon polyethylene alloy.

6. The air brake tubing claimed in claim 2 wherein said protective layer is from about 0.005 to about 0.010 inches.

7. The air brake tubing claimed in claim 6 wherein said high density polyethylene layers are from about 0.024 to about 0.039 inches thick.

8. The air brake tubing claimed in claim 5 wherein said nylon layers are from about 0.005 to about 0.01 inches.

9. The air brake tubing claimed in claim 1 wherein said high density polyethylene is a high density polyethylene nylon blend.

10. Delamination resistant air brake tubing comprising the following layers in the follow stated order, starting with an innermost layer:
   a first nylon layer;
   a first high density polyethylene layer;
   a second nylon layer;
   a polyester fiber reinforcing layer;
   a third nylon layer;
   a second high density polyethylene layer; and
   an outermost nylon layer.

11. Delamination resistant air brake tubing comprising inner and outer nylon layers:
   a polyester fiber reinforcing layer between said nylon layers;
   a first polyolefin layer between said nylon layers; and
   a protective layer separating said polyolefin layer from said fiber reinforcing layer wherein the protective layer is compatible with both the polyolefin and the fiber reinforcing layers.

12. The tubing claimed in claim 11 wherein said protective layer is nylon.

13. The tubing claimed in claim 12 wherever said polyolefin is selected from the group consisting of polyethylene, polypropylene, polybutylene and blends thereof.

14. The tubing claimed in claim 11 wherein said first polyolefin layer is adjacent said outer nylon layer and wherein said tubing further comprises a second polyolefin layer adjacent said inner nylon layer wherein said tubing further comprises a second protective layer separating said second polyolefin from the inner surface of said fiber reinforcing layer.

* * * * *

UNITED STATES PATENT AND TRADEMARK OFFICE
CERTIFICATE OF CORRECTION

PATENT NO.    : 6,071,579
DATED         : June 6, 2000
INVENTOR(S)   : Edward A. Green et al.

It is certified that error appears in the above-identified patent and that said Letters Patent is hereby corrected as shown below:

Claim 1, column 5,
Line 57, "inner most" should be -- innermost --.
Line 60, "and outer surface said" should be -- and outer surface, said --.

Claim 3, column 6,
Line 49, "layers is adjacent" should be -- layer should be adjacent --.

Signed and Sealed this

Ninth Day of October, 2001

Attest:

NICHOLAS P. GODICI
Attesting Officer    Acting Director of the United States Patent and Trademark Office